H. A. GOTTLIEB.
ATTACHMENT FOR STEREOPTICONS.
APPLICATION FILED JULY 6, 1912.

1,093,401.

Patented Apr. 14, 1914.
6 SHEETS—SHEET 3.

FIG. 3.

WITNESSES
G. Robert Thomas
L. J. Gallagher

INVENTOR
Herman A. Gottlieb
BY Munn & Co.
ATTORNEYS

H. A. GOTTLIEB.
ATTACHMENT FOR STEREOPTICONS.
APPLICATION FILED JULY 6, 1912.

1,093,401.

Patented Apr. 14, 1914.
5 SHEETS—SHEET 4.

WITNESSES
G. Robert Thomas
L. J. Gallagher

INVENTOR
Herman A. Gottlieb
BY Munn & Co.
ATTORNEYS

H. A. GOTTLIEB.
ATTACHMENT FOR STEREOPTICONS.
APPLICATION FILED JULY 6, 1912.

1,093,401.

Patented Apr. 14, 1914.
5 SHEETS—SHEET 5.

WITNESSES
G. Robert Thomas
T. J. Gallagher

INVENTOR
Herman A. Gottlieb
BY
ATTORNEYS

UNITED STATES PATENT OFFICE.

HERMAN A. GOTTLIEB, OF NEW YORK, N. Y.

ATTACHMENT FOR STEREOPTICONS.

1,093,401.

Specification of Letters Patent.  Patented Apr. 14, 1914.

Application filed July 6, 1912. Serial No. 707,961.

*To all whom it may concern:*

Be it known that I, HERMAN A. GOTTLIEB, a citizen of the United States, and a resident of the city of New York, borough of Manhattan, in the county and State of New York, have invented a new and Improved Attachment for Stereopticons, of which the following is a full, clear, and exact description.

This invention relates generally to attachments for stereopticons or similar structures and more particularly to a magazine for lantern slides with means for successively feeding the slides therefrom.

The principal object of my invention is to provide a new and improved magazine for holding lantern slides, with coöperating parts for successively permitting the slides to be positioned in front of the condensers, such operation, together with the consequent operation of taking care of the exposed slides, being under the control of the operator.

A further object of the invention is to provide a magazine for holding lantern slides, used with stereopticons or similar structures, with means for successively bringing the slides from the magazine into position in front of the condensers, together with a dissolving mechanism which operates at proper times, whereby the change on the screen from one slide to the next one is made pleasing and not abrupt.

The invention is characterized by a number of coöperating elements under the control of the operator, whereby the slides are successively taken from the magazine and brought into position in front of the source of light, other co-acting parts taking care of the slides already exposed, the dissolving mechanism which coöperates with the above parts being timed to operate at proper moments.

A still further object of the invention is the production of means for bringing slides successively into position in front of the condensers of the stereopticon, the mechanism being particularly adapted for use with lamp houses used with motion picture machines.

It is of some importance in the production of mechanism for effecting the purposes stated that the parts be few and of simple construction, whereby efficiency and low cost of manufacture is provided, and such means have been kept in mind in the particular embodiment of the inventive idea described and claimed.

Reference is to be had to the accompanying drawings, forming part of this specification, in which similar characters of reference denote corresponding parts in all the views, and in which—

The outfit described in the drawings comprises any suitable table or support 1 on which the mechanism 2 for feeding the film is suitably held, with an objective 3 mounted in position on the structure 2, a lamp house 4 containing any suitable source of light with the usual condensers being shown. The illustration of and the reference to the motion picture machine is, of course, merely one use to which the invention may be put, it being understood that the presence of such machine is not at all necessary nor is the particular type of lamp house or support shown essential.

Figure 3:
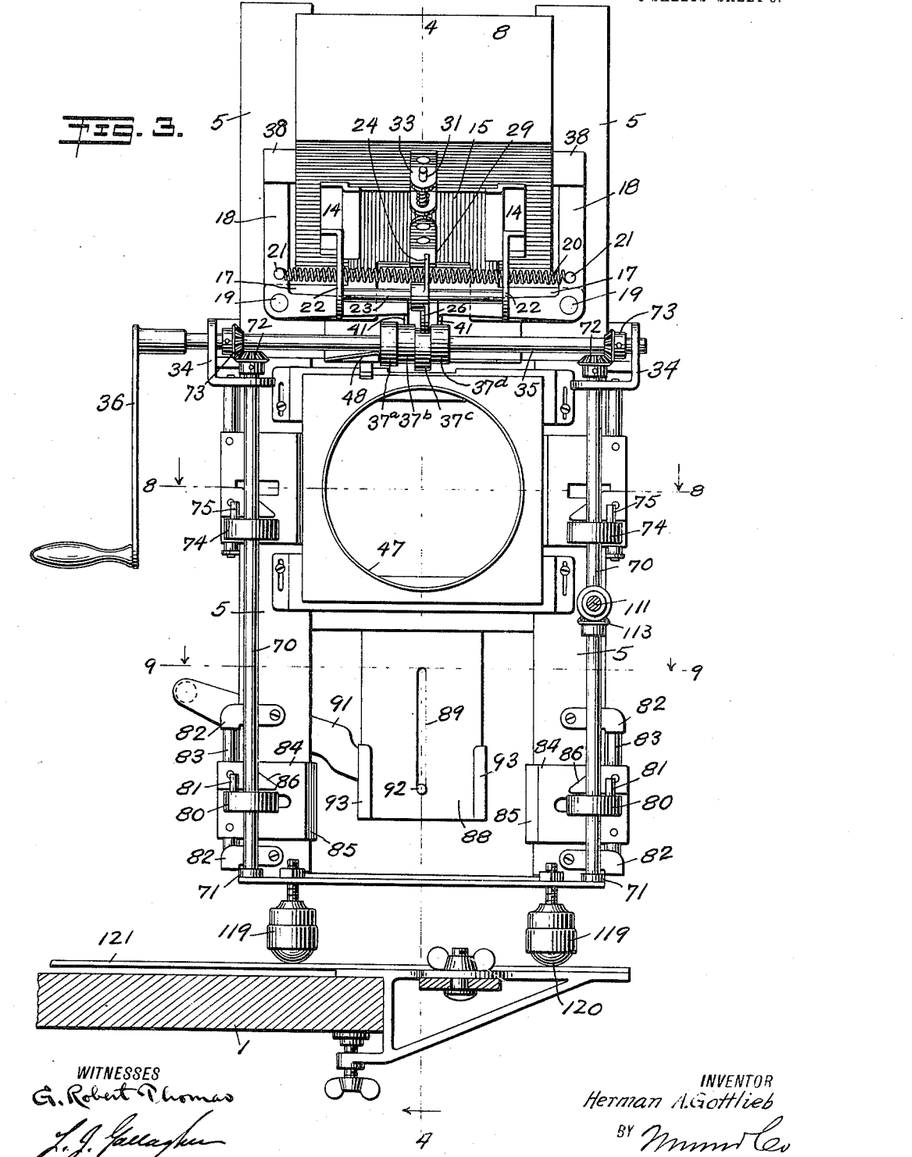
Fig. 3 is a front view of the magazine and means for successively bringing the slides therefrom.
Figures 4, 5:
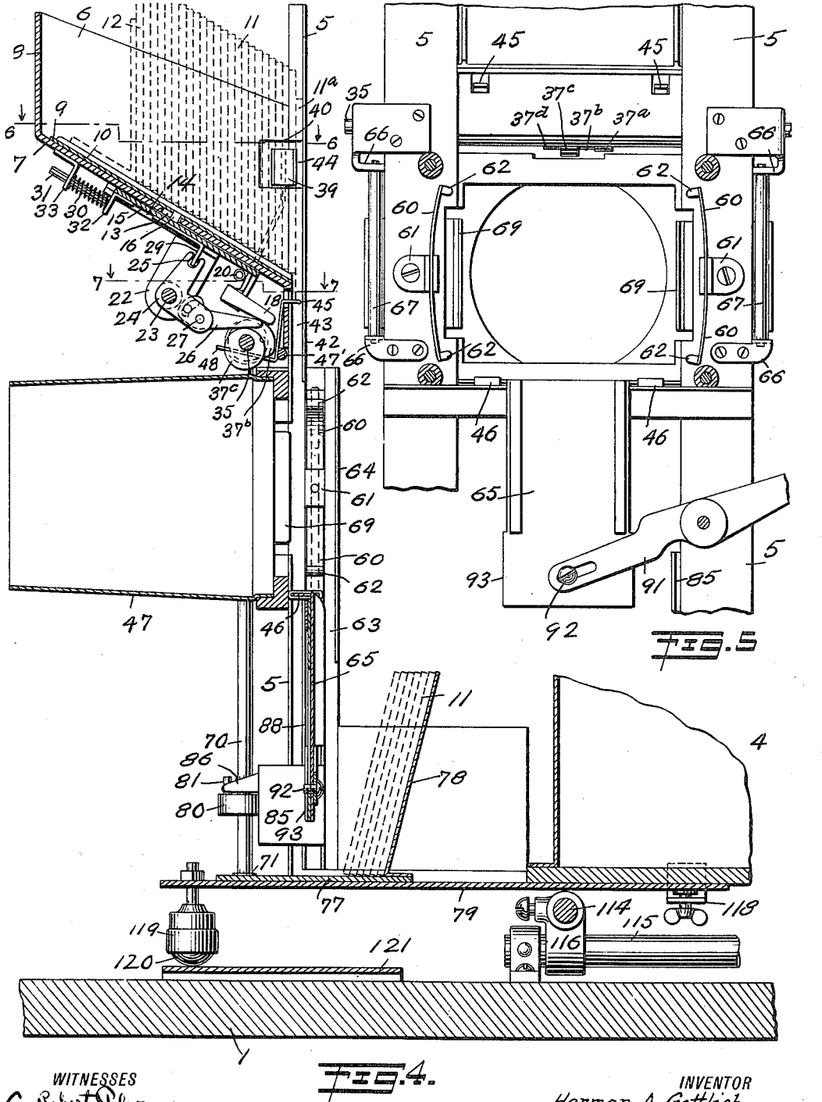
Fig. 4 is a vertical sectional view on the line 4—4 of Fig. 3.
Fig. 5 is a detailed view, partly sectional, showing the means for holding the exposed slide in position.

The magazine for holding the slides and the mechanism for successively bringing them into exposed position in front of the source of light is preferably positioned on the lamp house and movable therewith, the manner of mounting being shown particularly in Figs. 3 and 4. Suitably fixed in position to the base on which the lamp house 4 is mounted are the vertically extending standards 5, to the top of which is secured the magazine 6. The magazine preferably comprises an inclined bottom 7 with a vertically extending rear side 8, the front of the magazine being adjacent the standards and being open.

Movably mounted on the bottom 7 is the plate 9, preferably provided with a number of longitudinally extending ribs 10 on which a number of lantern slides 11 are maintained in upright position; a follower 12 is preferably contained within the magazine and serves to prevent the slides 11 from falling back. This follower moves along with the slides under the influence of gravity, the particular means for insuring such movement of the slides being now described.

The bottom 7 of the magazine is provided with an opening 13; on the bottom are also secured the bearings 14, in which the plate 15 is slidably mounted, the plate being provided with a pin 16 which extends upwardly through the said opening 13 and engages with the movable plate 10 in the magazine. Extending from one side of the movable plate 15 are the arms 17 to which the bell cranks 18 are pivoted at 19 at intermediate points, the upwardly extending arms of the bell cranks being maintained in certain position through the medium of the helical spring 20 extending between the arms and connected thereto in any suitable manner, as by means of pins 21.

Extending from the bottom of the magazine 6 are supports 22, between which is revolubly mounted a spindle or shaft 23 carrying a bell crank 24, one end of which is provided with a recess 25, the other end of the bell crank carrying a movable finger 26 adjustable about a pin 27 through the medium of the pin and slot 28 in the bell crank. Extending downwardly from the plate 15 which is mounted slidingly in position is a lug 29 which engages in the opening 25 in the bell crank 24 so that, as the shaft 23 is turned, the plate 15 will be given a to and fro movement and with it the movable plate 9 within the magazine on top of which the slides 11 rest; in order to maintain the plates 9 and 15 normally toward the standards 5, the helical spring 30 is used, which is mounted on an arm 31, one end of which is fixed to the end 32 of the said plate 15, the arm moving in a bearing 33 carried on the under side of the magazine, the ends of the spring bearing against the end 32 and the bearing 33 respectively. It may be noted that the slides 11 may be moved forwardly toward the standards 5 by this movement of the plate 9 in the bottom of the magazine, provided certain means are availed of to hold the slides against backward movement; such a structure is employed and will be set forth more fully later, the particular means made use of to obtain the to and fro movement of the plates 9 and 15 being now described.

Mounted in suitable bearings 34 and extending in a horizontal plane is the shaft 35 having a crank 36 at one end, the intermediate portion of the shaft being provided with a number of cams $37^a$, $37^b$, $37^c$, $37^d$. It will be understood that these cams are so positioned and are adjustable relatively to the shaft 35 so that the proper timing of the different elements depending on these cams will be secured in order to obtain the proper operation of the machine.

The adjustable finger 26 at one end of the bell crank 24 which is used to move the plates 9 and 15 back and forth engages with or rests on the cam $37^c$; the before-mentioned spring 30 carried beneath the magazine, in addition to the purpose already described of maintaining the plates normally in one position, also insures the engagement between this finger 26 and the cam, so that turning of the shaft 35 may be depended on to move the plates.

Figure 6:
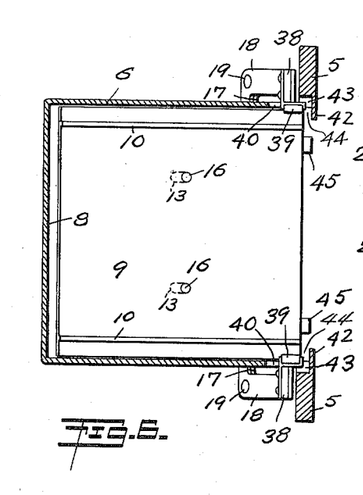
Fig. 6 is a horizontal sectional view on the line 6—6 of Fig. 4.

Referring now particularly to Figs. 3 and 6, a particular means employed for engaging with some of the slides 11 within a magazine in order to properly hold them during operation of the parts will be set forth. The beforementioned bell cranks 18, which are pivotally mounted at 19 on the arms 17 carried by the movable plate 15, extend upwardly along opposite sides of the magazine, the upper ends of the arms being inwardly turned, as at 38, the inner ends of such parts being provided with cushions or pads 39 adapted to come into engagement with certain of the slides within the magazine 6. Due to the spring 20 connected to these bell cranks 18, the ends 38 and pads 39 thereof will normally lie within the magazine; it is to be noted, however, that the bearings or pivotal mounting means 19 for the bell cranks is carried by the arms 17 which form part of the movable plate 15, so that, as this plate 15 reciprocates during operation of the parts as described, the bell cranks will move with it, the ends 38 with the cushions 39 thereon also moving; the opposite sides of the magazine are provided with openings 40 which permit such movement in addition to the other movement about to be described, due to the said pivotal mountings 19.

Figure 7:
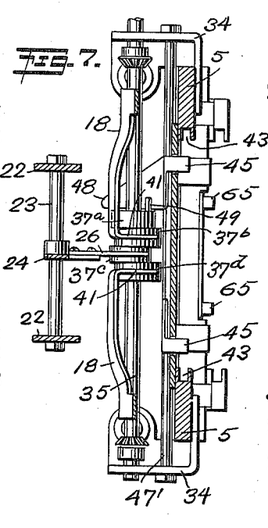
Fig. 7 is a horizontal vertical sectional view on the line 7—7 of Fig. 4.

Referring now particularly to Fig. 7, it will be noted that the adjacent ends of the lower portions of the bell cranks 18 are bent or offset, as at 41, and that such ends come into engagement with or rest on the beforementioned cams $37^b$, $37^d$, carried by the shaft 35. The relation of these cams $37^b$, $37^d$, with respect to the cam $37^c$ is shown particularly in Figs. 3 and 4, it being noted that the upper ends or the pads or cushions 39 carried by the bell cranks 18 and extending within the magazine 6 will partake of two distinct movements when the shaft 35 is turned, due to the influence of the three cams $37^b$, $37^c$, $37^d$. It will be particularly noted that the cam $37^c$ is eccentric to one side of the center of the shaft 35, while the cams $37^b$ and $37^d$ are eccentric to another side with relation to this same center so that, when the plates 9 and 15, which effect the forward feeding or movement of the slides 11 within the magazine, are moving in forward (that is, feeding) position, the ends 39 of the bell cranks 18 are out of engagement with opposite sides of the slides 11 which lie adjacent the guides 5; however, further turning of the shaft 35 to move the plate 10 within the magazine backwardly occurs when the position of the cams 37ᵇ, 37ᵈ, is such that the ends of these bell cranks 18 are in engagement with the opposite sides of the slides adjacent the standards 5, so that a return movement of the slides within the magazine is prevented, due to such engagement along with the forward pressure brought to bear against the rear slide because of the mass of the follower 12.

It is to be noted from Figs. 4 and 6 that the standards 5 on their adjacent sides are provided with extensions 42, the provision of which results in channels or guides 43 in these standards adjacent the forward end of the magazine; it will be noted also from Fig. 4 that the gripping portions 39 at the ends of the bell cranks 18 do not extend into this guide or channel 43 but are positioned a distance 44 therefrom sufficient to permit a slide 11ᵃ to be contained between the side wall 42 of the guide 5 and the edge portion of the gripping finger 39 so that this slide 11ᵃ is not influenced by the said gripping fingers but is supported in such position by resting on movable fingers 45, which extend beyond the edge portion of the bottom of the magazine and into the path defined as a channel or guide 43. It is obvious now that if means are provided for moving the fingers 45 to the rear out of engagement with the said slide 11ᵃ, that this slide will drop down through the guide or channel 43, coming into engagement with the stop 46 positioned therein and a suitable distance below the center of the light rays which are thereby brought to bear on this slide through the tube 47 which is common in stereopticons.

In order to effect the proper movement of the fingers 45 to the rear, that is, to permit any slide, in the position of the one 11ᵃ, to come down against the stop 46, which is the exposed position of the slide, the following structure is preferably employed.

Referring particularly to Figs. 4 and 7, it will be noted that two of these fingers 45 are provided, being carried on a spindle or shaft 47′, one of the fingers having a rearwardly extending portion 48 which is adapted to be periodically actuated by means of the cam 37ᵃ having a pin 49 extending to one side thereof and adapted to engage this end 48 at proper intervals. Of course this particular form of pin and cam may be changed, and the cam used without the pin, the provision of the pin, however, permitting, perhaps, a wider range of adjustment. To summarize, then, the slides 11 within the magazine are fed forwardly or toward the standards 5 by means of the reciprocating movement of the plate 9. The slides are prevented from backward movement through the medium of the fingers 39 which engage opposite sides of those slides 11 adjacent the forward end, one of the slides 11ᵃ, however, being brought forwardly into the channel or guide 43, and resting on the fingers 45 during the forward movement of the plate 9, which occurs when the fingers 39 are out of engagement with the ends of the slides, thereby permitting such forward movement. Such movements as have been described are effected through turning the shaft 35 by means of the crank or handle 36, it being obvious that the speed at which the shaft is turned will determine the rate at which the slides are dropped into the channel, the speed, however, being under the control of the operator who may vary it, depending on the rapidity with which successive slides must be exposed.

Referring now to Figs. 4 and 5, it will be noted that at the bottom of the channel or guide 43, to one side thereof, and preferably carried on the standards 5, are the resilient elements 60, which are in the form of springy strips of material secured at their middle portions to suitable holders 61, whereby the four of them are independently movable; it will be noted that at the free ends of these elements are lugs 62 or equivalent devices. The rear walls 42, which form the channel or guide 43, terminate adjacent the upper resilient elements 60 so that when a slide drops through the channel and comes to rest on the stops 46, such slide is positioned directly adjacent the springs 60; it will be noted that the width of these stops 46 is substantially equal to the width of the channel 43, plus the width of the springs or resilient elements 60, (Fig. 4) and that adjacent the other side of these resilient elements is a second channel or passageway 63 determined by a side wall 64 adjacent its upper end and by a movable wall 65 opposite thereto and adjacent the lower end.

Figure 8:
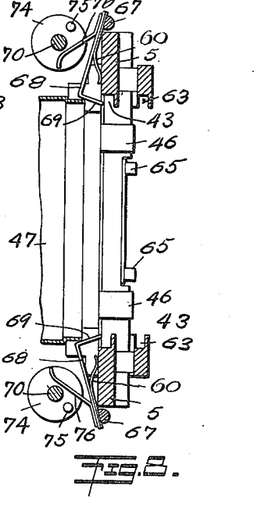
Fig. 8 is a horizontal sectional view on the line 8—8 of Fig. 3.

Referring now to Figs. 5 and 8, it will be noted that the standards 5 along their outer edge portions are provided with bearings 66 in which are mounted spindles 67, hooked arms 68 being secured to these spindles, the inner bent ends 69 of the arms being adapted to be moved into the said channel 43 intermediate the said resilient elements or springs 60.

Suitably mounted in position adjacent the front of the uprights 5 (Fig. 3) are the vertically extending shafts 70 mounted in suitable bearings 71 at their lower ends and in the offset ends of the previously mentioned bearings 34 at their upper ends, the said upper ends being provided with bevel gears 72 meshing with other bevel gears 73 carried on the previously mentioned transversely extending shaft 35 so that as this shaft 35 is turned, bringing about the operation already described, the interengagement of these gears will turn the vertically extending shafts 70 in opposite directions. Intermediate the ends of these shafts 70 are cams 74 which take the form of circular elements secured to the shaft and having pins 75 extending upwardly therefrom. Referring now particularly to Fig. 8, it will be noted that outwardly extending resilient members, such as springs 76, are secured to the beforementioned hooked arms 68, these said springs 76 lying in the paths of the pins 75 so that, when the shafts 70 are turned, the pins will intermittently engage them in order to move the hooked arms and bring the bent ends 69 into the passage or guideway 43 already described. It is clear now that if a slide is dropped from the magazine and is resting on the stops 46, in position of exposure in front of the condensers, the inward movement of the ends 69 of the hooked arms 68 will force the slide bodily inwardly and carry it into engagement and fixed in position between the lugs 62 at the ends of the resilient elements 60.

Figure 9:
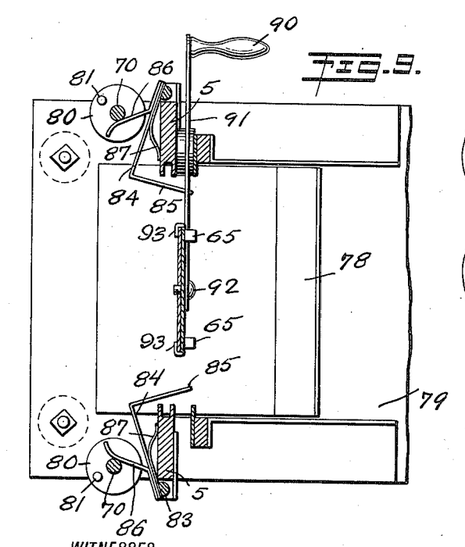
Fig. 9 is a horizontal sectional view on the line 9—9 of Fig. 3.

Referring now to Figs. 3, 5, and 9; if, while the slide just mentioned is in position between the resilient elements 60, the machine being continuously operated, a second slide should drop through the passageway 43, the said slide will rest on the stops 46, being positioned directly in front of the slide first-mentioned, and the next inward movement of the ends 69 of the hooked arms 68 will force the first slide backwardly out of engagement with the said resilient elements 60 into the passageway 63, where, due to its own weight, it will drop, finally resting on the movable carrier 77. This carrier comprises a base and a back 78 suitably secured together and movable along the base 79, the movement of the carrier and the slides thereon being accomplished in the following manner. Secured to the previously mentioned vertically extending shafts 70 are cams 80 which embody upwardly extending pins 81 similar in construction to the cams 74 already described; secured to the outer sides of the standards 5 are bearings 82 in which suitable spindles 83 are mounted, hooked arms 84 being secured thereto and turning therewith, the inner ends 85 of these arms being adapted to be moved intermittently into the rear of the standards 5 and come into engagement with the successively positioned slides 11 which have been received within the carrier 77; this movement is effected by reason of the engagement between the offset arms 86 carried by the said hooked arms 84 engaging with the pins 81 as the shafts are turned, the ends 85 being maintained in the positions shown in Fig. 9 by reason of leaf springs 87 carried by the arms and engaging the standards.

From the construction and description of operation given, it is believed that the manner of using the outfit is apparent; the magazine being filled with slides in proper sequence, turning the handle 36 continuously permits the slides to be intermittently passed through the passageway 43 into position for exposure, with consequent removal from such position into final position on the carrier 77. It is clear, however, that after the last slide has been brought into exposed position in front of the objective and in engagement with the resilient elements 60, that further operation of the device will not remove this last slide from exposed position and bring it into final position in the carrier, and other means, substantially as follows, are provided for this purpose.

Fixed in position between the standards 5 and adjacent the lower ends thereof is a support 88 having a slot 89 therein; pivotally mounted on one of the standards is a lever 91 having a handle 90 fixed thereon, the outer end of this lever having a pin 92 which engages in the said slot 89. The movable wall 65, (Fig. 4) previously mentioned, is mounted on its support 88, being held in position by means of overturned side portions 93, the said pin 92 which passes into the slot 89 being in engagement with this movable wall, the upper end portion of which is tapered, as shown particularly in Fig. 4. After the ends 69 of the hooked arms 68 have brought the last slide into position between the flexible elements 60, such slide is brought into or thrown back within the passageway or guide 63 by pressing downwardly on the handle 90, thereby bringing the said movable wall 65 upwardly, the tapered end permitting the wall to engage the front of the said slide, forcing the same to the rear, after which it drops onto the carrier 77; it is, of course, necessary to use this auxiliary means for returning the last slide to final position only after the last slide has been exposed.

Mounted on the front of the base of the machine is an offset arm 94 having a socketed standard 95 thereon, the arm being also provided with a slot 96 in which an adjustable clamping device 97 is placed, which device is mounted on the base of the machine; within the socketed portion 95 and adjustable with respect thereto is a standard 98 having a bifurcated upper end 99 with a shaft 100 extending thereacross. On this shaft are cams 101, 102. Movably mounted at the bifurcated end 99 is a second shaft 103 on which are movably mounted the levers 104, 105, each of which is provided at its outer end with the translucent element 106, which together form a dissolving mechanism, the other ends of the levers 104, 105, being pivotally connected to pitmen 107, whereby, as the shaft 100 is turned constantly in one direction, the translucent elements 106 will approach and overlap each other and will be moved remote from each other, these translucent elements being positioned in front of an objective 108 mounted in a suitable casing carried at the forward end of the machine in line with the condensers and the source of light, whereby the stereopticon mechanism is produced.

Figure 1:
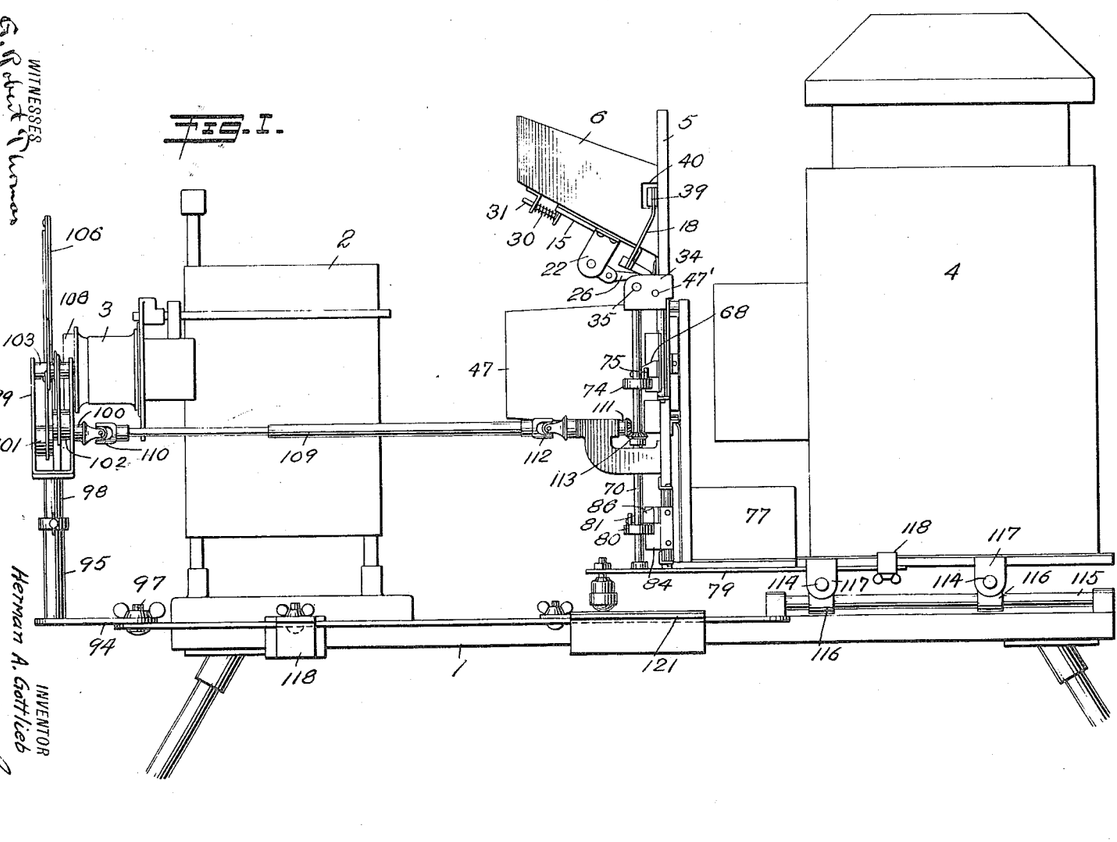
Figure 1 is a side view of a motion picture outfit comprising the invention herein described and claimed.
Figure 2:
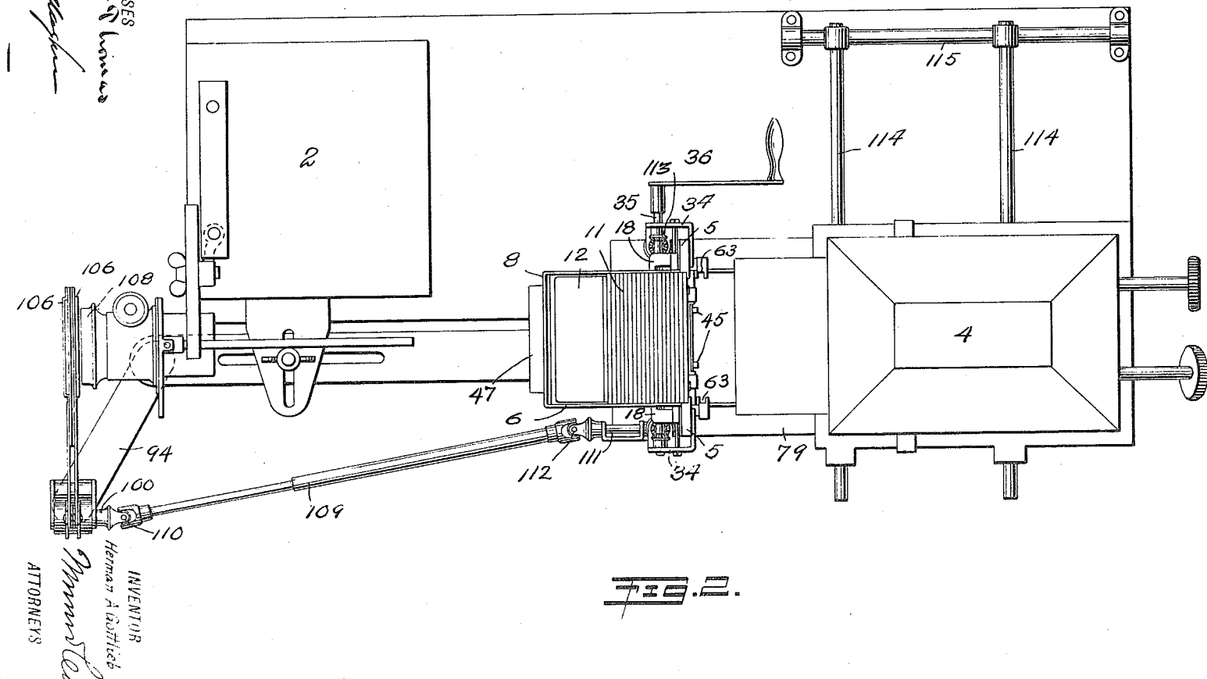
Fig. 2 is a top plan view thereof.

Referring particularly to Figs. 1, 2, and 3, it will be noted that the end of the shaft 100 is connected with another shaft 109 made up of two parts telescopically related, the connection being made through the medium of a universal coupling 110; secured to the frame of the lantern or, rather, to the frame which carries the magazine, is a shaft 111 connected to the shaft 109 by means of a second universal coupling 112, this shaft 111 being actuated by the upwardly extending shaft 70 so that, when the handle 36 is turned, thereby actuating the slide feeding mechanism, the dissolving mechanism will also be actuated. The engagement between the shafts 111 and 70 is preferably by means of meshing bevel gears 113 secured to the respective shafts.

Figure 10:
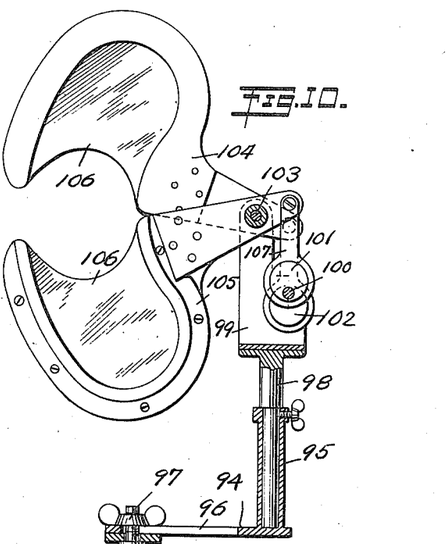
Fig. 10 is a partial vertical sectional view of the dissolving mechanism.

It will be remembered that when a slide has been positioned for exposure by means of the resilient elements 60 and in front of the condensers, a second slide is dropped at the proper moment in front of the first slide, further operation of the mechanism resulting in a backward movement of the slides, due to the ends 69 of the arms 68, whereby the first slide falls down through the passageway 65; the dissolving mechanism which has been described is timed with respect to the cams 74 mounted on the shafts 70 at the sides of the machine so that the image of one slide on the screen decreases in intensity through the dissolving mechanism before the second slide comes into position in front of the first one, thereby doing away with overlapping images on the screen, the translucent elements 106 of the dissolving mechanism separating, as shown in Fig. 10, after the first slide has dropped down to the carrier 77, thereby providing for a gradual change from one image to the next. It will, of course, be understood that the cams 80 which actuate the arms 84, whereby the exposed slides are moved along with the carrier 77, are also properly timed. The final result is, as will be gathered from the description set forth, that constant turning of the handle 36 actuates the different cams and the dissolving mechanism in a proper sequence and at proper periods so that the succession of slides is passed through the lantern, one image dissolving into the next one.

The particular utility of the telescoping shaft or rod 109 is to permit the lantern 4 with the magazine carrying the slides to be moved from position behind the objective 108 into position behind the motion picture mechanism 2. In order to provide for movement of the lantern or the lamp house definitely from one position to another, the base of the machine is preferably provided with transversely extending rails 114 suitably mounted on supports 115 carried by the base through the medium of bearings 116, the lower part of the lamp house being provided with socketed elements 117 carried on the rails 114.

The magazine and the coöperating parts thereof may be secured in position on the lamp house in any desirable and suitable manner, being particularly well adapted for use with existing lamp houses, Figs. 1 and 4 setting forth an efficient interengagement; the base or bottom 79 (Fig. 4) is secured to the lamp house by means of clamps 118 of any desired form of construction, the forward end of this base 79 being provided with casters 119, preferably embodying revoluble balls 120 adapted to be moved over the support 121 carried by the base 1 of the machine. Of course where lamp houses are built with the magazine as a part, the construction may be simplified in that the mechanism may be secured thereto through use of less parts.

Many details of construction will suggest themselves to persons skilled in the art in the manufacture of the mechanism herein disclosed, which details, however, do not embody departures from the inventive idea set forth. The particular manner of mounting the shafts and the magazine on the standards 5, as well as the manner of mounting the tube 47 with the frame therein in front of the condensers shown in the drawings is merely one form which the construction may take, the inventive idea comprehending structures capable of performing the functions indicated rather than the particular constructions illustrated.

Having thus described my invention, I claim as new, and desire to secure by Letters Patent:—

1. The combination of a magazine adapted to contain a number of slides, means whereby the slides may be successively moved therefrom into position of exposure in front of a lantern, other means for bringing each succeeding slide into such position in front of the previous slide and removing the said previous slide from such position, and devices for taking care of the previous slide after such removal.

2. The combination of a magazine adapted to contain a number of slides, means whereby each succeeding slide is brought into position in front of a lantern and held in such position, the said means permitting each succeeding slide to be positioned in front of the previous slide in such position, and means for removing the first slide from such position and bringing the succeeding one into the position occupied by the previous slide.

3. The combination of a magazine adapted to contain a number of slides, means whereby the slides are removed successively therefrom into position in front of a lantern, means for moving a slide from such position into a second position, means whereby the next slide is caused to come into position in front of the first one and a carrier, the said means for moving the second slide into the position occupied by the first one, also removing the first slide and permitting it to fall into the carrier.

4. The combination of a magazine adapted to contain a number of slides, means whereby each succeeding slide is singly moved from the magazine into position in front of a lantern, means for bringing such slide into a second position, means engaging the slide for holding it secured in such position, means for causing the next succeeding slide to come into position in front of the first one and a carrier, the said means for moving the second slide into secured position occupied by the first one also forcing the said first slide out of such secured position and permitting it to fall into the carrier.

5. The combination of a magazine adapted to contain a number of slides, resilient elements for holding each succeeding slide in fixed position in front of a lantern, a passageway between the magazine and the said resilient elements, and a second passageway to the rear of the first one and extending between the said resilient elements and a carrier, and means whereby the slides may be successively passed through the passageways from the magazine to the carrier.

6. The combination of a magazine adapted to contain a plurality of lantern slides, a passageway communicating with the magazine, means whereby a slide may be moved into the passageway, a stop for determining the position of the slide within the passageway, members adapted to engage each succeeding slide to hold it fixed in exposed position in front of the lantern, means for moving each succeeding slide into engagement with such members, a carrier, and another passageway through which the slides pass to the carrier after exposure.

7. The combination of a magazine adapted to contain a number of slides, a stop adapted to be engaged by each slide successively, a passageway between the magazine and the said stop, said stop operating through the passageway, members to one side of the said passageway adapted to engage a slide and hold it in exposed position in front of a lantern, means for moving each successive slide into engagement with such members, a carrier, and a passageway for guiding the successive slides to the carrier after they are moved out of engagement with the said members.

8. The combination of a passageway containing a plurality of oppositely positioned members for holding a lantern slide in position in front of a lantern, a magazine containing a number of slides, said passageway being adapted for guiding the successive slides from the magazine adjacent the said oppositely positioned members, the said members being to one side of the passageway, means for moving each slide out of the said passageway into engagement with the said members, thereby leaving the passageway open for the next slide, means whereby movement of the next slide into position occupied by the first one will move the first slide out of such position, a passageway to the other side of the said members and a carrier, the said second passageway guiding the first slide to the carrier after exposure.

9. Mechanism of the class described comprising a plurality of passageways disposed in spaced relation, a magazine adapted to contain a number of lantern slides communicating with one of the passageways, a retainer adapted to contain the slides after exposure and communicating with the other passageway, a plurality of movable members, the said movable members being positioned between the said passageways, means for moving the slides successively through the first passageway adjacent the said movable members, other means for bringing said slides into engagement with the said members, and for moving the said slide out of engagement with the said members into the second passageway when the next succeeding slide has come adjacent the first slide whereby the first slide will pass through the said second passageway to a suitable carrier.

10. In a structure such as described, the combination of a plurality of objectives placed adjacent each other, a dissolving mechanism in front of one objective, a lamp house adapted to be moved into alinement with either of the objectives, a slide feeding mechanism carried by the lamp house, means for operating the mechanism, and means between the said mechanism and the said dissolving mechanism, whereby the said mechanisms coöperate, the said means permitting the said movement of the lamp house.

11. In a structure such as described, the combination of objectives placed beside each other, a dissolving mechanism adjacent one objective, a housing carrying a source of light and slide feeding mechanism, means for operating the mechanism, and telescoping parts between the said operating mechanism and the dissolving mechanism, whereby the parts coöperate, the said housing being adapted to be moved into alinement with either of the objectives, as desired.

12. The combination of a magazine adapted to contain a number of slides on edge, means for successively feeding the slides to exposed position in front of a lantern, said means including means for agitating the slides to feed them by gravity, coöperative means to engage the edges of the slides to grip and release the same, means for arresting the motion of the slides before their passage to exposed positions, a dissolving mechanism, means for operating the feeding mechanism, and operative connections between the dissolving mechanism and the feed operating mechanism to simultaneously operate the two intermittently.

13. The combination of a magazine adapted to contain a number of slides on edge, means for successively feeding the slides to exposed position in front of a lantern, said means including means for agitating the slides to feed them by gravity, coöperative means to engage the edges of the slides to grip and release the same, before the release of the same to exposed positions, means for supporting the slides in exposed positions, a dissolving mechanism, means for operating the feeding mechanism, and operative connections between the dissolving mechanism and the feed operating mechanism to simultaneously operate the two intermittently.

In testimony whereof I have signed my name to this specification in the presence of two subscribing witnesses.

HERMAN A. GOTTLIEB.

Witnesses:
 JOHN ZIPSER,
 B. SOMER.